US008893836B2

(12) United States Patent
Asano et al.

(10) Patent No.: US 8,893,836 B2
(45) Date of Patent: Nov. 25, 2014

(54) GRILLE SHUTTER APPARATUS

(71) Applicant: Aisin Seiki Kabushiki Kaisha, Kariya-shi (JP)

(72) Inventors: Yoshimasa Asano, Kariya (JP); Dai Hidaka, Anjo (JP); Shuhei Uchida, Chiryu (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 0 days.

(21) Appl. No.: 14/050,509

(22) Filed: Oct. 10, 2013

(65) Prior Publication Data
US 2014/0102817 A1    Apr. 17, 2014

(30) Foreign Application Priority Data
Oct. 15, 2012    (JP) .................................. 2012-228211

(51) Int. Cl.
*B60K 13/02*    (2006.01)
*B60K 11/08*    (2006.01)

(52) U.S. Cl.
CPC .......... *B60K 11/085* (2013.01); *B60Y 2306/15* (2013.01)
USPC ...................................................... 180/68.3

(58) Field of Classification Search
CPC ................................ B60K 11/00; B60K 11/04
USPC .................. 180/68.1; 701/49, 29; 454/74–75; 165/271
See application file for complete search history.

(56) References Cited

U.S. PATENT DOCUMENTS

| 7,559,391 | B2 * | 7/2009 | Bradley et al. ............. 180/68.1 |
| 8,136,487 | B2 * | 3/2012 | Bernt et al. ................ 123/41.05 |

FOREIGN PATENT DOCUMENTS

JP    58-139519    9/1983

OTHER PUBLICATIONS

U.S. Appl. No. 14/357,910, filed May 13, 2014, Asano et al.

* cited by examiner

*Primary Examiner* — John Walters
*Assistant Examiner* — James Triggs
(74) *Attorney, Agent, or Firm* — Oblon, Spivak, McClelland, Maier & Neustadt, L.L.P.

(57) ABSTRACT

A grille shutter apparatus includes a shutter mechanism including plural of movable fins and at least one connection mechanism independently arranged to connect every two of the movable fins adjacent to one another. Accordingly, the shutter mechanism makes the movable fins operate in conjunction with one another. The grille shutter apparatus further includes a control portion controlling a flow rate of air flowing from a grille opening portion formed at a front portion of a vehicle body into the vehicle body on the basis of opening and closing operations of the shutter mechanism, and a detection device detecting an operational state of the shutter mechanism on the basis of an operation of the movable fins which correspond to a most downstream portion of a serially-arranged driving force transmission path formed at the shutter mechanism.

6 Claims, 7 Drawing Sheets

GRILLE SHUTTER APPARATUS

CROSS REFERENCE TO RELATED APPLICATIONS

This application is based on and claims priority under 35 U.S.C. §119 to Japanese Patent Application 2012-228211, filed on Oct. 15, 2012, the entire content of which is incorporated herein by reference.

TECHNICAL FIELD

This disclosure generally relates to a grille shutter apparatus.

BACKGROUND DISCUSSION

A known grille shutter apparatus configured to control a flow rate of air flowing from a grille opening portion into an engine room in accordance with opening and closing operations of a shutter mechanism provided at the grille opening portion arranged at a front portion of a vehicle body is disclosed, for example, in JPS58-139519U (hereinafter referred to as Patent reference 1). The known grille shutter apparatus disclosed in Patent reference 1 includes a shutter mechanism formed such that plural movable fins are aligned within a frame provided in an inside of the grille opening portion. A flow path of the air shaped at an inside of the frame may be opened and closed by rotating each of movable fins about a rotary shaft using a motor driving force.

For example, in a case where the vehicle is running at a high speed, an aerodynamic performance (for example, Cd value, that is, coefficient of drag) of the vehicle is enhanced by limiting an inflow of the air flowing into the inside of the engine room by establishing a closed state of the shutter mechanism. When an engine starts, warm-up time is shortened by reducing the flow rate of the air introduced into a radiator of the vehicle. When an engine temperature has increasing tendency, an open state of the shutter mechanism is established to increase the flow rate of the air flowing into the inside of the engine room so that the engine temperature is controlled at an appropriate temperature.

The known grille shutter apparatus disclosed in Patent reference 1 includes the shutter mechanism configured with a connecting member rotatably connected to one of opposing ends in a width direction of each of the movable fins. By forming a link mechanism using the connecting member, each of the movable fins is configured to rotate in conjunction with one another.

The configuration of the above-described grille shutter apparatus including the plural movable fins disclosed in Patent reference 1, however, may generate variations in an operational position (a rotation amount) of each of the movable fins due to, for example, a malfunction of bearing portions of the movable fins. Thus, in order to confirm whether the shutter mechanism operates normally, the operational position of each of the movable fins needs to be detected. However, the configuration of the grille shutter apparatus may be complicated because the number of a detection device, for example, a limit switch, is increased, or manufacturing cost may be increased.

A need thus exists for a grille shutter apparatus which is not susceptible to the drawback mentioned.

SUMMARY

According to an aspect of this disclosure, a grille shutter apparatus includes a shutter mechanism including plural of movable fins and at least one connection mechanism independently arranged to connect every two of the movable fins adjacent to one another. Accordingly, the shutter mechanism makes the movable fins operate in conjunction with one another. The grille shutter apparatus further includes a control portion controlling a flow rate of air flowing from a grille opening portion formed at a front portion of a vehicle body into the vehicle body on the basis of opening and closing operations of the shutter mechanism, and a detection device detecting an operational state of the shutter mechanism on the basis of an operation of the movable fin which correspond to a most downstream portion of a serially-arranged driving force transmission path formed at the shutter mechanism.

According to another aspect of this disclosure, a grille shutter apparatus includes a shutter mechanism including plural movable fins and at least one connection mechanism independently arranged to connect every two of the movable fins adjacent to one another. Accordingly, the shutter mechanism makes the movable fins operate in conjunction with one another. The grille shutter apparatus further includes a control portion controlling a flow rate of air flowing from a grille opening portion formed at a front portion of a vehicle body into the vehicle body on the basis of opening and closing operations of the shutter mechanism, a first detection portion detecting an operational state of the shutter mechanism on the basis of an operation of the movable fin corresponding to the input portion of driving force, a second detection portion detecting the operational state of the shutter mechanism on the basis of the operation of the movable fin corresponding to the most downstream portion of the serially-arranged driving force transmission path formed at the shutter mechanism, and an abnormality determination portion determining an abnormal state of the movable fins in a case where detection results at the first and the second detection portions differ from one another.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
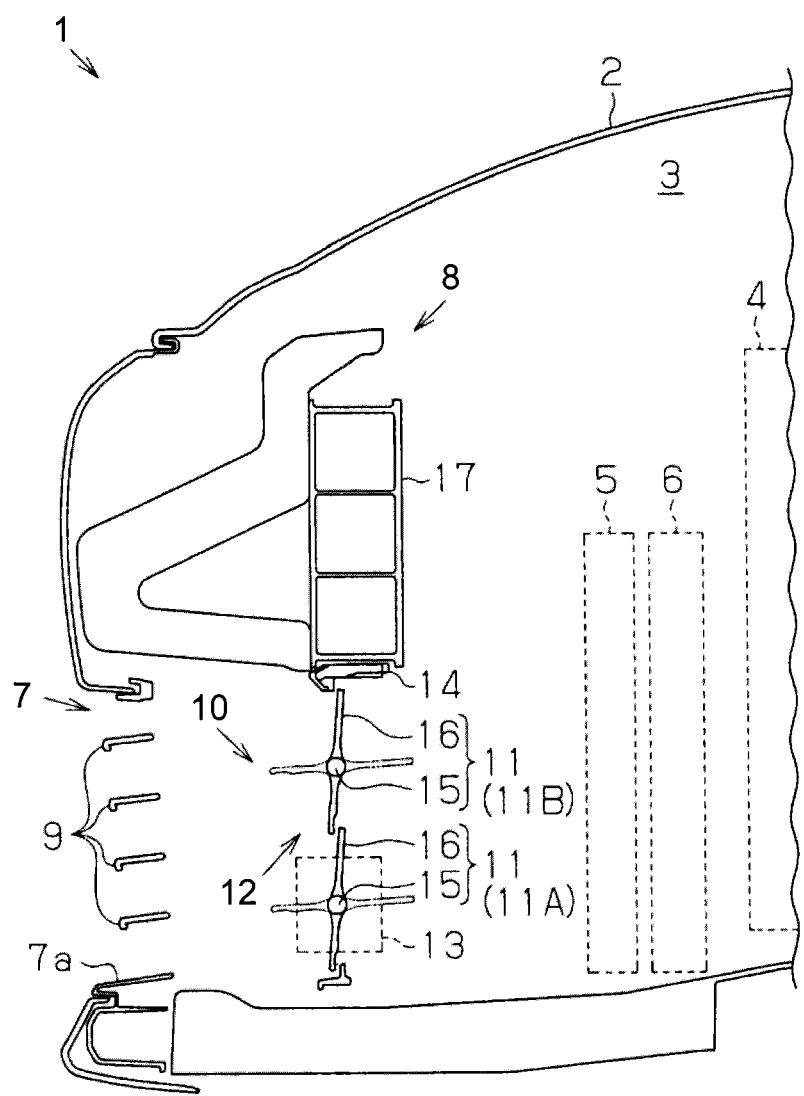
FIG. 1 is a side view schematically illustrating a configuration of a vehicle on which a grille shutter apparatus disclosed here is mounted.

A grille shutter apparatus 10 according to an embodiment will be described referring to drawings. FIG. 1 illustrates a vehicle 1 provided with an engine room 3 in a vehicle body 2. The engine room 3 contains a radiator 5 for cooling an engine 4. At a front portion of the vehicle body 2, which is illustrated at a left end in FIG. 1, a grille opening portion 7 communicating an external space at a front of the vehicle 1 and an internal space of the vehicle body 2 is formed. The radiator 5 is arranged frontward of the engine 4 such that the radiator 5 receives air that flows into the engine room 3 from the grille opening portion 7.

A fan 6 is provided at rearward relative to the radiator 5, which is, on a right side in FIG. 1. As the fan 6 rotates, the air efficiently flows to the radiator 5.

According to the embodiment, the grille opening portion 7 is formed downward relative to a bumper 8. At an opening end 7a of the grille opening portion 7, a front grille 9 providing a design surface, (a lower grille) is attached. The grille shutter apparatus 10 of the embodiment provided on the vehicle 1 is configured to control a flow rate of the air flowing from the grille opening portion 7 into an inside of the engine room 3.

Figure 2:
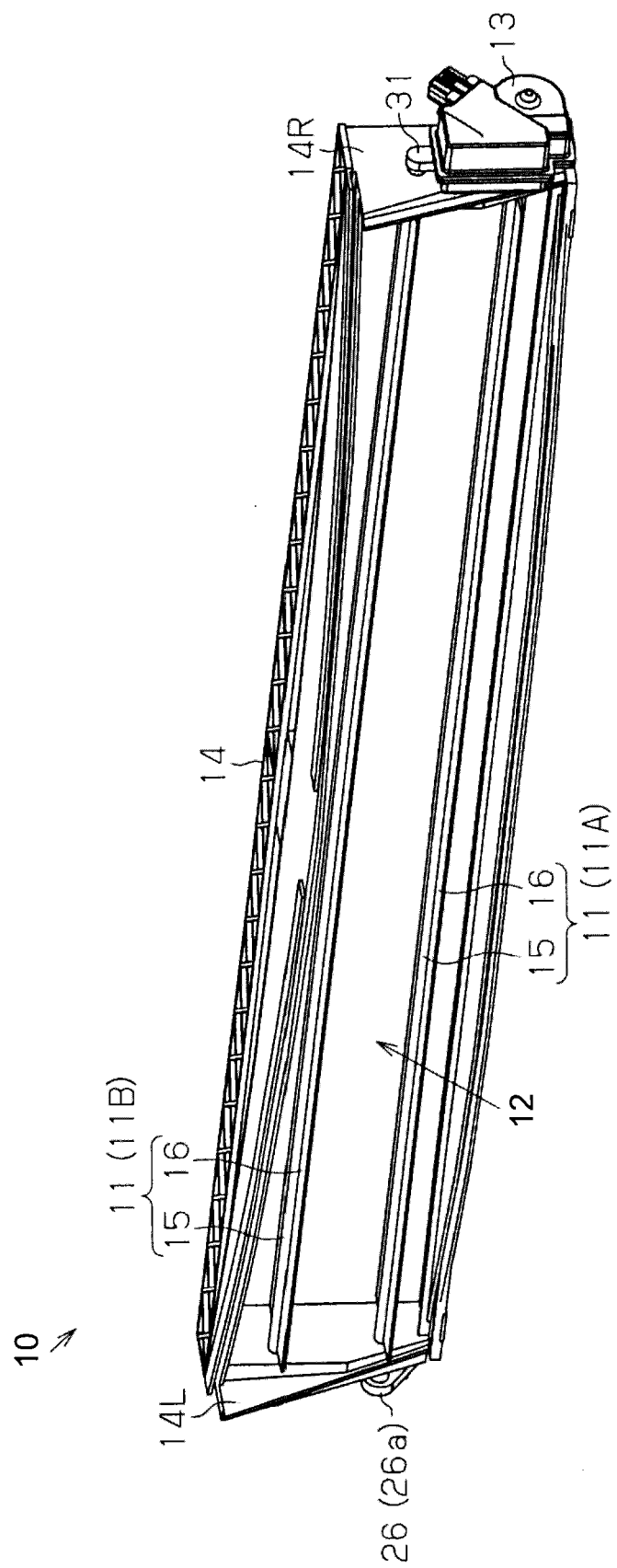
FIG. 2 is a perspective view of the grille shutter apparatus according to an embodiment.
Figure 3A:
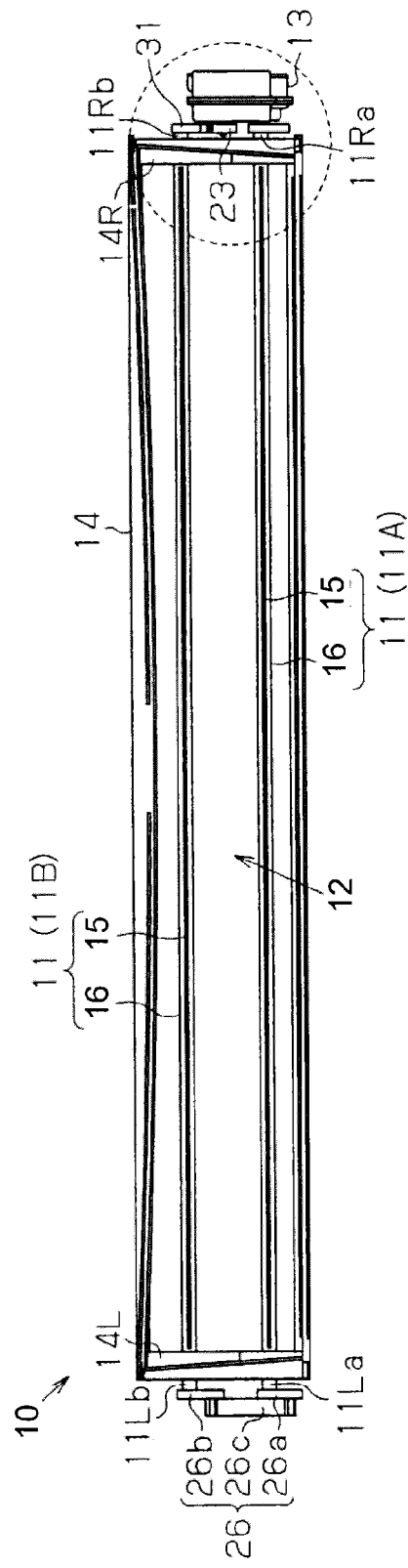
FIG. 3A is a front view of the grille shutter apparatus according to the embodiment.

In further detail, the grille shutter apparatus 10 is configured with the shutter mechanism 12 including plural movable fins 11 and an actuator 13 driving the shutter mechanism 12 so that the shutter mechanism 12 opens and closes. As illustrated in FIGS. 2 and 3A, the shutter mechanism 12 of the embodiment includes a frame 14 formed in a substantially rectangular shape extending in a width direction (a right-left direction in FIG. 3A) of the vehicle body 2. Each of the movable fins 11 is rotatably supported within a framework of the frame 14.

In particular, each of the movable fins 11 includes a rotary shaft 15 extending in a range of the sidewall portions 14L and 14R of the frame 14 and is rotatably supported by the rotary shaft 15. Each of the movable fins 11 includes a fin portion 16 which selectively closes the framework of the frame 14 by rotating about the rotary shaft 15. The shutter mechanism 12 of the embodiment includes movable fins 11A, 11B, arranged in two rows parallel to one another in an up-down direction within the framework of the frame 14. As illustrated in FIG. 1, the shutter mechanism 12 of the embodiment is arranged in an inside of the grille opening portion 7 where an upper end of the frame 14 is fixed to a bumper reinforce 17.

According to the shutter mechanism 12 of the embodiment, each of the movable fins 11 rotates in a direction to bring the fin portions 16 in parallel in a flow direction of the air flowing from the grille opening portion 7 (that is, the movable fins 11 rotate in a clockwise direction seen in FIG. 1); thereby, the shutter mechanism 12 is brought into an open state. On the other hand, each of the movable fins 11 rotates in a direction to bring the fin portions 16 in perpendicular in the flow direction of the air flowing from the grille opening portion 7 (that is, the movable fins 11 rotate in a counterclockwise direction seen in FIG. 1); thereby, the shutter mechanism 12 is brought into a closed state. In addition, in a state where each of the movable fins 11 is in a position corresponding to a fully-closed state, the framework of the frame 14 may be closed by overlapping respective ends (respective fin ends of the fin portions 16) of each of the movable fins 11 adjacent to one another.

Figure 4:
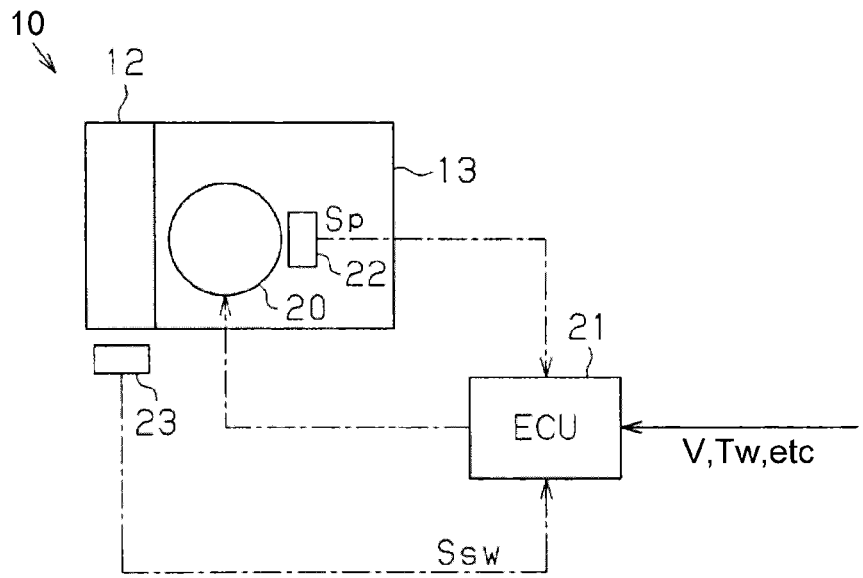
FIG. 4 is a control block diagram of the grille shutter apparatus according to the embodiment.

As illustrated in FIG. 4, the actuator 13 drives the shutter mechanism 12 so that the shutter mechanism 12 opens and closes by rotating each of the movable fins 11 using a motor 20 as a driving source. An operation of the actuator 13 is controlled by an ECU (Electronic Control Unit) 21 (serving as a control portion, a first detection portion, a second detection portion and an abnormality determination portion) which serves as a control means.

The ECU 21 controls opening and closing operations of the shutter mechanism 12. The grille shutter apparatus 10 of the embodiment controls the flow rate of the air flowing from the grille opening portion 7 to the engine room 3 in accordance with the opening and closing operations of the shutter mechanism 12 by rotational movement of each of the movable fins 11.

In further detail, according to the embodiment, the ECU 21 receives various vehicle state quantities including a vehicle speed V and a cooling water temperature Tw of the engine 4. Then, the ECU 21 controls the shutter mechanism 12 so that the shutter mechanism 12 opens and closes in accordance with the aforementioned vehicle state quantity.

Specifically, the ECU 21 recognizes that an ignition switch of the vehicle 1 is turned on (IG-on), that is, the vehicle is either in a driving state or in a state of preparation for driving by starting communication of each of the vehicle state quantities via an in-vehicle network. The ECU 21 controls known opening and closing operations, for example, to maintain the shutter mechanism 12 in the closed state until the cooling water temperature Tw increases, or to bring the shutter mechanism 12 to the closed state because the vehicle speed V increases.

According to the embodiment, the ECU 21 is connected to a pulse sensor 22 provided in the actuator 13 and detects an operation amount of the shutter mechanism 12 on the basis of a pulse signal Sp inputted from the pulse sensor 22. The pulse signal Sp is synchronized with the rotational movement of the motor 20. Further, the ECU 21 is connected to a limit switch 23 (serving as a detection device) which detects a fully-open position of the shutter mechanism 12. The ECU 21 determines whether the shutter mechanism 12 terminates an opening operation control normally on the basis of an output signal (an on/off signal) Ssw of the limit switch 23.

Figure 5:
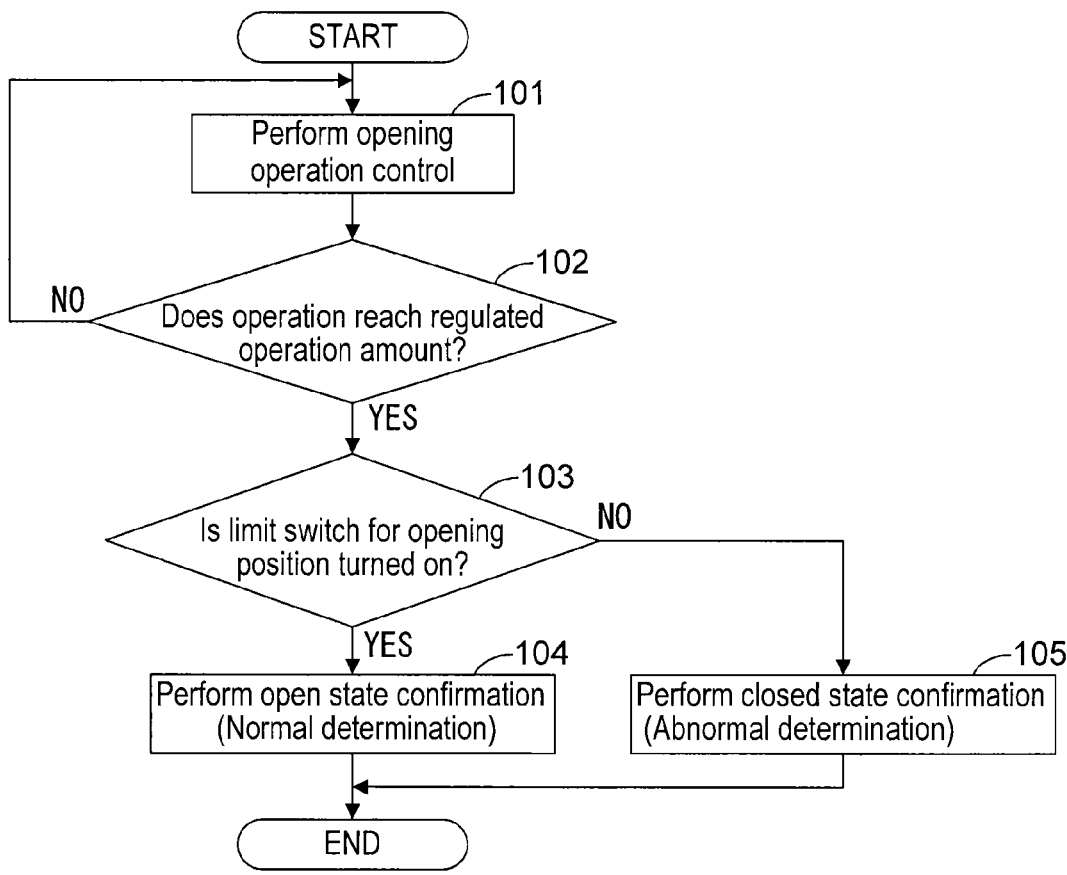
FIG. 5 is a flow chart illustrating procedures of an opening operation control and of a determination to confirm a fully-open state of the shutter mechanism of the grille shutter apparatus according to the embodiment.

In further detail, as illustrated in the flow chart of FIG. 5, the ECU 21 monitors the detected operation amount of the shutter mechanism 12 on the basis of the pulse signal Sp. At the same time, the ECU 21 performs the opening operation control of the shutter mechanism 12 (at Step 101) until the detected operation amount reaches to a regulated operation amount corresponding to the fully-open state of the shutter mechanism 12 (Yes at Step 102).

In a case where the detected operation amount reaches to the regulated operation amount (Yes at Step 102), the ECU 21 determines whether the limit switch 23 (limit switch for opening position) is turned on (at Step 103). In a case where the limit switch 23 is turned on (Yes at Step 103), the ECU 21 detects that the shutter mechanism 12 is in the fully-open state and determines that the opening operation control is terminated normally (at Step 104).

On the other hand, in a state where the limit switch 23 is not turned on, that is, in a state where the ECU cannot detect whether the shutter mechanism 12 is in the fully-open state (No at Step 103), the ECU 21 determines that the opening operation control is in an abnormal state (at Step 105). Then, the opening operation control is performed again to make the shutter mechanism 12 be in the fully-open state.

Figure 6:
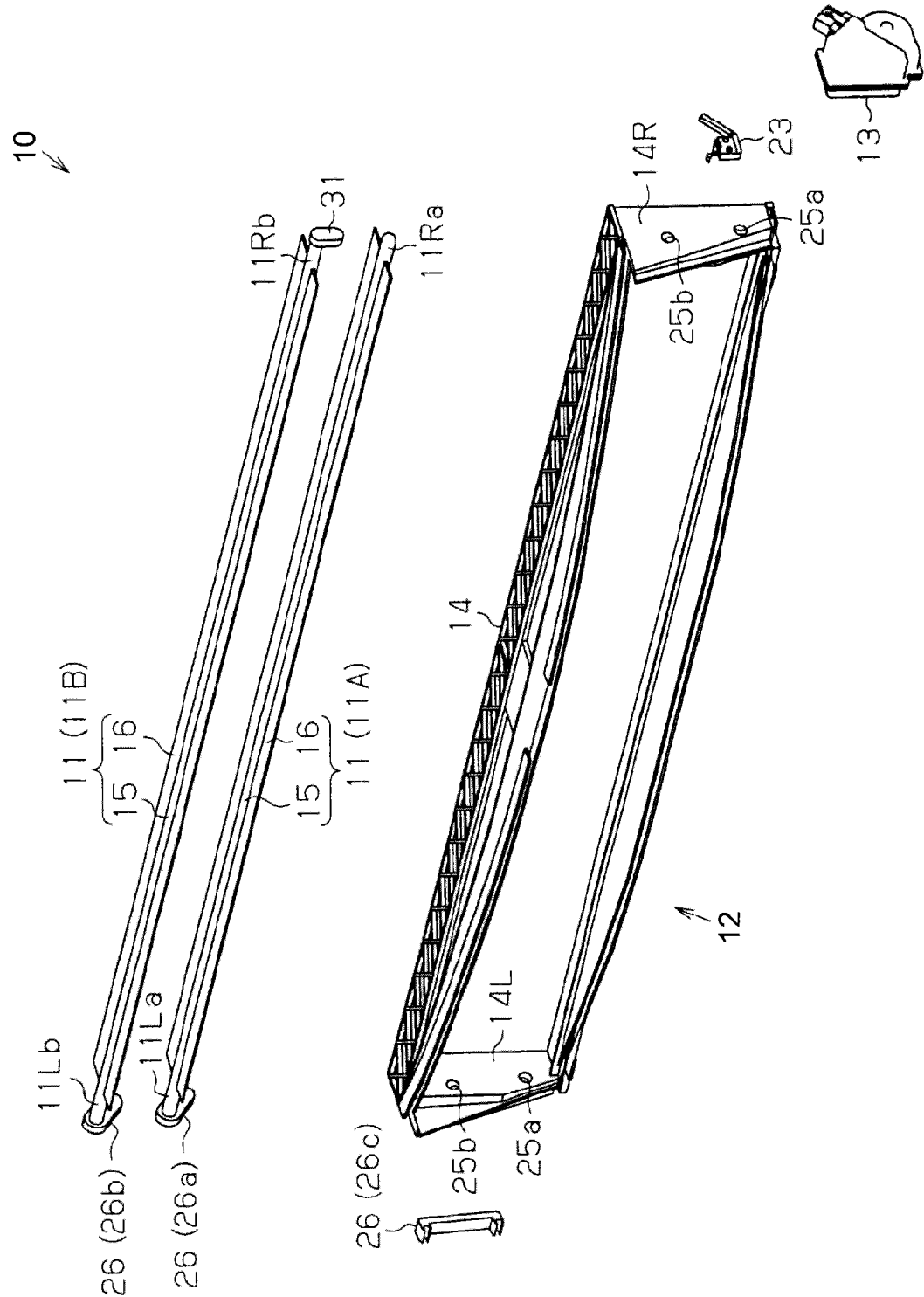
FIG. 6 is an exploded perspective view of the grille shutter apparatus according to the embodiment.

Next, a structure for detecting an operational state of the shutter mechanism 12 of the embodiment will be described. As illustrated in FIG. 6, according to the embodiment, the sidewall portions 14L, 14R of the frame 14 include, for example, two supporting holes 25a, 25b arranged in the up-down direction (up-down direction seen in FIG. 3A) for supporting the movable fins 11 (11A, 11B), respectively, so as to be separated from one another. As illustrated in FIG. 3A, opposing end portions of the rotary shafts 15 of the movable fins 11A, 11B are inserted into the supporting holes 25a, 25b, respectively, so that the movable fins 11A, 11B are rotatably supported by the frame 14 with the fin portions 16 arranged in an inside of the framework of the frame 14.

As illustrated in FIGS. 3A and 6, the shutter mechanism 12 of the embodiment includes a link mechanism 26 (serving as a connection mechanism) connecting shaft end portions 11La, 11Lb of each of the movable fins 11A, 11B one another.

Figure 3C:
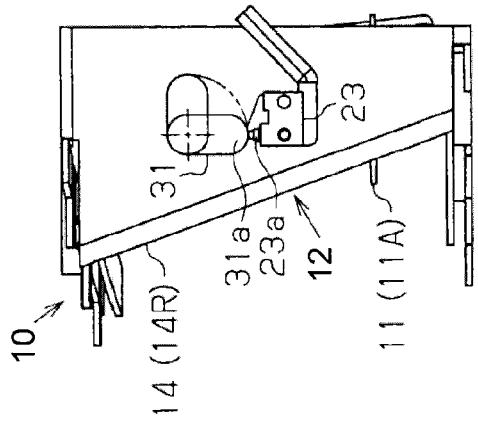
FIG. 3C is an explanatory view of an operation of a limit switch provided at a side surface of a frame of the grille shutter apparatus according to the embodiment.
Figure 3B:
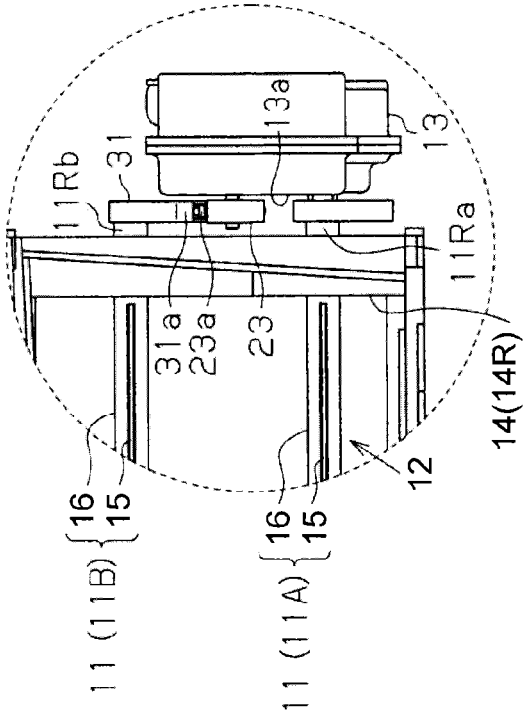
FIG. 3B is an enlarged view near an actuator of the grille shutter apparatus according to the embodiment.

In particular, the link mechanism 26 includes a known configuration including a pair of lever members 26a, 26b and a connecting member 26c. The lever members 26a, 26b are fixed to the shaft end portions 11La, 11Lb of the movable fins 11A, 11B, respectively, protruding out of the framework of the frame 14 in a manner of penetrating the sidewall portion 14L. The connecting member 26c is rotatably connected to each tip of the shaft end portions 11La, 11Lb. As illustrated in FIGS. 2, 3A and 3B, the actuator 13 of the embodiment is fixed to the sidewall portion 14R of the frame 14. At an outside of the framework of the frame 14, the actuator 13 is configured to drive the shaft end portion 11Ra arranged opposite to the link mechanism 26 of the movable fin 11A arranged at a lower row of the movable fins 11.

Figure 7:
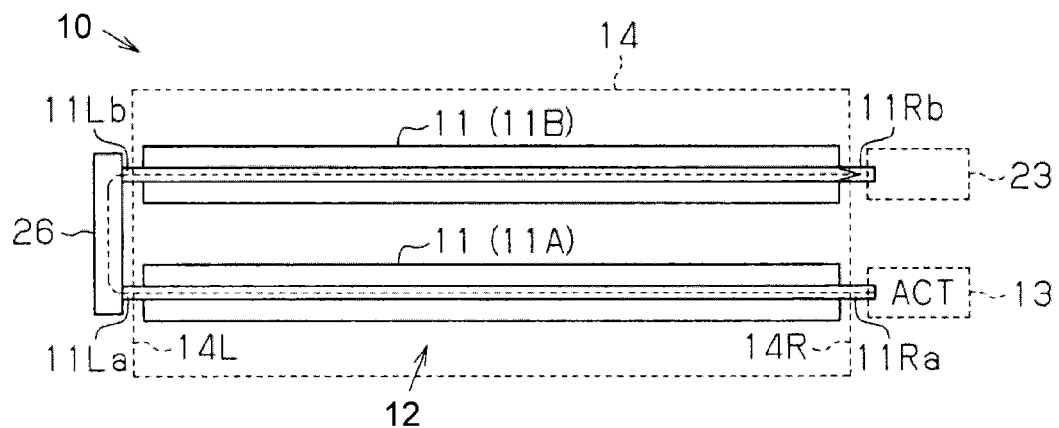
FIG. 7 is an explanatory view of a serially-arranged driving force transmission path formed at the shutter mechanism according to the embodiment.

As illustrated in FIG. 7, the shutter mechanism 12 of the embodiment is configured to form a serially-arranged driving force transmission path from the movable fin 11A arranged at the lower row of the movable fins 11 to the movable fin 11B arranged at an upper row of the movable fins 11 via the link mechanism 26. Thus, the movable fin 11A rotates in conjunction with the movable fin 11B in accordance with the driving force transmitted from the shaft end portion 11Ra on the right side of the movable fin 11A arranged at the lower row of the movable fins 11 to the shaft end portion 11La on the left side of the movable fin 11A, and from the shaft end portion 11Lb on the left side of the movable fin 11B arranged at the upper row of the movable fins 11 to the shaft end portion 11Rb on the right side of the movable fin 11B. According to the embodiment, the limit switch 23 (see FIG. 4) is configured to serve as a detection device which is for detecting the operational state of the shutter mechanism 12, or further in detail, a fully-open position of the shutter mechanism 12, by being turned on/off in accordance with the rotational movement of the movable fin 11B which is arranged at the upper row of the movable fins 11 and corresponds to a most downstream portion of the serially-arranged driving force transmission path.

Further in detail, as illustrated in FIGS. 3A, 3B, 3C and 6, the lever member 31 integrally rotated with the movable fin 11B is fixed to the shaft end portion 11Rb of the movable fin 11B arranged at the upper row of the movable fins 11. As described above, the shaft end portion 11Rb protrudes out of the framework of the frame 14 in a manner of penetrating the sidewall portion 14R of the frame 14. The limit switch 23 includes a switch portion 23a (serving as a switch) which is pressed by the lever member 31 in accordance with the rotary position of the lever member 31. The limit switch 23 is fixed to the sidewall portion 14R of the frame 14 via the actuator 13.

Specifically, as illustrated in FIG. 3B, the limit switch 23 of the embodiment is fixed to a side surface 13a of the actuator 13 arranged to face the sidewall portion 14R of the frame 14. Accordingly, the limit switch 23 is fixed to the sidewall portion 14R integrally with the actuator 13.

Next, an operation of the grille shutter apparatus 10 with a structure described above will be described. As illustrated in FIG. 3C, when the shutter mechanism 12 performs an opening operation, the lever member 31 provided at the shaft end portion 11Lb of the movable fin 11B arranged at the upper row of the movable fins 11 rotates in a direction (in a clockwise direction in FIG. 3C) so that an end portion 31a of the lever member 31 comes close to the limit switch 23 arranged in a lower direction relative to the lever member 31. According to the embodiment, in a case where the movable fin 11B arranged at the upper row of the movable fins 11 rotates to a position where the shutter mechanism 12 is in the fully-open state, the grille shutter apparatus 10 is configured such that the end portion 31a of the lever member 31 presses on the switch portion 23a of the limit switch 23.

According to the embodiment, the following effects and advantages are attained. First, the shutter mechanism 12 includes the movable fins 11A, 11B arranged in two rows parallel to one other in the up-down direction within the framework of the frame 14. The shaft end portions 11La, 11Lb of the movable fins 11A, 11B adjacent to one another in the up-down direction are connected one another via the link mechanism 26. Further, a driving force of the actuator 13 is inputted to the shaft end portion 11Ra, opposite to the link mechanism 26 of the movable fin 11A arranged at the lower row of the movable fins 11, resulting in that the serially-arranged driving force transmission path is formed in the shutter mechanism 12. The grille shutter apparatus 10 includes the limit switch 23 which detects the fully-open position of the shutter mechanism 12 on the basis of the rotational movement of the movable fin 11B which is arranged at the upper row of the movable fins 11 and corresponds to the most downstream portion of the serially-arranged driving force transmission path.

The movable fin 11B which is arranged at the upper row of the movable fins 11 and corresponds to the most downstream portion of the serially-arranged driving force transmission path rotates normally only in a case where the link mechanism 26 arranged at an upper stream of the driving force transmission path and the movable fin 11A arranged at the lower row of the movable fins 11 do not generate abnormality. That is, the movable fin 11A arranged at the lower row of the movable fins 11 rotates to the position where the shutter mechanism 12 is in the fully-open state as long as the movable fin 11B rotates to the position where the shutter mechanism 12 is in the fully-open state. Thus, according to the above configuration, the fully-open position of the shutter mechanism 12 may be precisely detected in a simple configuration without increasing the number of the detection devices.

Second, because, for example, two of the movable fins 11A, 11B are arranged parallel to one other in the up-down direction an input portion of the driving force by the actuator 13 and a detection portion for detecting the fully-open position by the limit switch 23 may be set at the end portion of the movable fins 11A, 11B in the same side (the shaft end portions 11Ra, 11Rb of the movable fins 11A, 11B). Thus, as the actuator 13 and the limit switch 23 are assembled simply while a connection line between the actuator 13 and the limit switch 23 is arranged in a simple manner, work efficiency is enhanced.

Third, by connecting the shaft end portions 11La, 11Lb of the movable fins 11A, 11B one another, the serially-arranged driving force transmission path is formed in a substantially entire length of the movable fins 11A, 11B. As a result, the fully-open position of the shutter mechanism 12 may be detected more precisely. Additionally, the opening portion of the shutter mechanism 12 may be precisely or detected even if, for example, the rotary shaft 15 of each of the movable fins 11A, 11B may possibly be divided into plural shafts in the longitudinal direction and each of the divided shafts may be rotatable relative to one another.

Forth, because the limit switch 23 is formed integrally with the actuator 13, the limit switch 23 and the actuator 13 are assembled more simply.

Fifth, the lever member 31 is fixed to the shaft end portion 11Lb of the movable fin 11B arranged at the upper row of the movable fins 11 to be integrally rotatable with the movable fin 11B. The limit switch 23 includes the switch portion 23a pressed by the lever member 31 by the rotational movement of the lever member 31. The limit switch 23 is fixed to the sidewall portion 14R of the frame 14 via the actuator 13. Thus, the detection device for detecting the fully-open position of the shutter mechanism 12 is formed in a simple structure without interfering with the opening and closing operations of the shutter mechanism 12.

The aforementioned embodiment may be changed or modified as follows. According to the aforementioned embodiment, the air flowing from the grille opening portion 7 flows into the engine room 3 formed in the vehicle body 2. Alternatively, air may flow into any inner space of the vehicle body 2 other than the engine room 3 as long as a flow rate of air is controllable based on the opening and closing operations of the shutter mechanism 12. Air may flow into a housing of a heat exchanger such as the radiator 5, for example, serving as a void to which air from the grille opening portion 7 is introduced. The grille shutter apparatus 10 of the embodiment may be applied to a vehicle in which an engine is arranged at a rear portion or a center of a vehicle body, or to an electric vehicle in which an engine is not mounted to an inner space of a vehicle body in front of a vehicle cabin.

According to the aforementioned embodiment, the grille opening portion 7 is formed at a lower portion of the bumper 8. Alternatively, the grille opening portion 7 may be formed at an upper portion of the bumper 8. That is, the front grille 9 may be an upper grille.

According to the aforementioned embodiment, the fully-open position of the shutter mechanism 12 is detected on the basis of the operational position (rotary position) of the movable fin 11B which is arranged at the upper row of the movable fins 11 and correspond to the most downstream portion of the serially-arranged driving force transmission path. Alternatively, the grille shutter apparatus 10 may include a configuration in which either the fully-open position or the fully-open and the fully-closed positions of the shutter mechanism 12 may be detected to describe operational state of the shutter mechanism 12.

Further, the detection device may be formed freely as long as the operational state of the shutter mechanism 12 is detected based on the operation of the movable fin 11B which is arranged at the upper row of the movable fins 11 and corresponds to the most downstream portion of the serially-arranged driving force transmission path.

According to the aforementioned embodiment, the detection device for detecting the fully-open position of the shutter mechanism 12 is formed by the lever member 31 and the limit switch 23. The lever member 31 is fixed to the shaft end portion 11Rb of the movable fin 11B arranged at the upper row of the movable fins 11 and integrally rotates with the movable fin 11B. The limit switch 23 is turned on/off in accordance with the rotary position of the lever member 31. Alternatively, for example, the grille shutter apparatus 10 is configured with a sensor which detects an operation amount (a rotation amount) of the movable fin 11B instead of the limit switch 23 for detecting the operational position. Further, the detection device may be freely arranged. For example, the switch portion 23a of the limit switch 23 can be pressed by the fin portion 16 of the movable fin 11B.

Other than the push-style limit switch in the aforementioned embodiment, for example, a rotary switch or proximity switch (for example, an electrostatic-type proximity switch or magnetic-type proximity switch) may be used to detect the operational position. In addition, other than using a rotational angle sensor (for example, a pulse-detection sensor, magnetic-type sensor or coil-type sensor), detection methods for operation amount, for example, using a current or a rotary switch may be applied.

According to the aforementioned embodiment, the link mechanism 26 is formed by the pair of the lever members 26a, 26b and the connection member 26c. The lever members 26a, 26b are fixed to the shaft end portions 11La, 11Lb of the movable fins 11A, 11B, respectively. The connection member 26c is connected rotatably relative to the end portions of the lever members 26a, 26b. Alternatively, the link mechanism 26 for configuring the connection mechanism may be freely formed. As the connection mechanisms other than the link mechanism 26, for example, a gear or pulley may be configured to connect with the movable fins 11A, 11B.

According to the aforementioned embodiment, for example, two of the movable fins 11 (11A, 11B) are arranged parallel to one another in the up-down direction. However, the number of the movable fins is not limited to two. The grille shutter apparatus 10 may be configured with three or more movable fins 11 as long as the movable fins rotate in conjunction with one another by including a connection mechanism (for example, a link mechanism) independently arranged to connect every two movable fins which are adjacent to one another.

Figure 8:
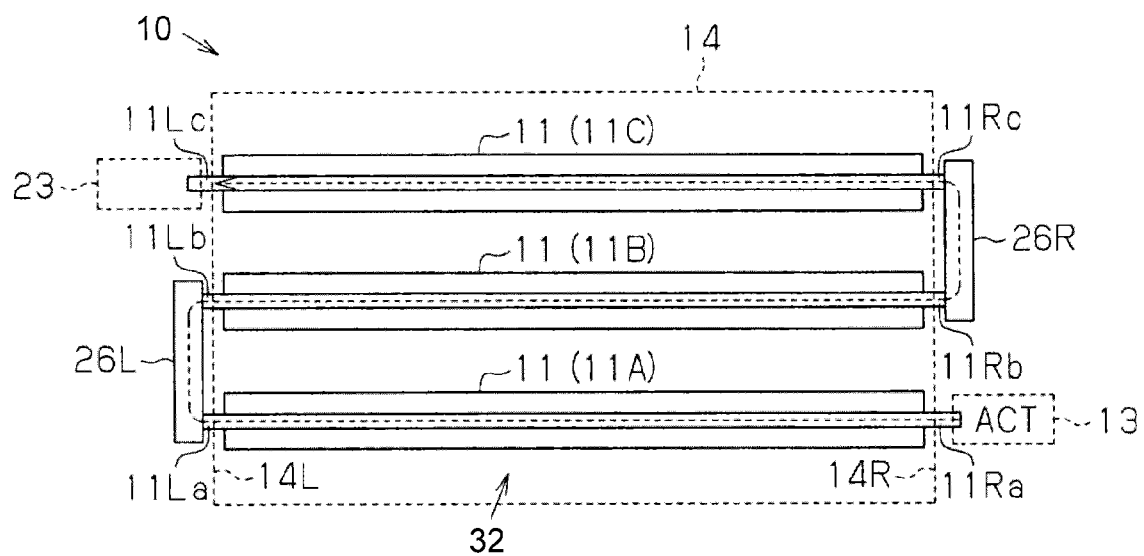
FIG. 8 is an explanatory view of a serially-arranged driving force transmission path according to another example of the embodiment.

For example, a shutter mechanism 32 illustrated in FIG. 8 includes three movable fins 11A, 11B, 11C arranged parallel to one another in the up-down direction within the framework of the frame 14. In the shutter mechanism 32, the shaft end portion 11La of the movable fin 11A and the shaft end portion 11Lb of the movable fin 11B adjacent in the up-down direction are connected via a link mechanism 26L while the shaft end portion 11Rb of the movable fin 11B and the shaft end portion 11Rc of the movable fin 11C are connected via a link mechanism 26R. Further, the actuator 13 is fixed to the sidewall portion 14R of the frame 14 and drives the shaft end portion 11Ra of the movable fin 11A. The limit switch 23 is fixed to the sidewall portion 14L opposite to the actuator 13 so as to be turned on/off in accordance with the rotary position of (the shaft end portion 11Lc of) the movable fin 11C.

In the configuration described above, a serially-arranged driving force transmission path is formed at the shutter mechanism 32 illustrated in FIG. 8. The serially-arranged driving force transmission path is arranged from the movable fin 11A arranged at a lower row of the movable fins 11 to the movable fin 11B arranged at a middle row of the movable fins 11 via the link mechanism 26L, and from the movable fin 11B arranged at the middle row of the movable fins 11 to the movable fin 11C arranged at an upper row of the movable fins 11 via the link mechanism 26R. Accordingly, similar effects as those of the aforementioned embodiment are obtained.

Figure 9:
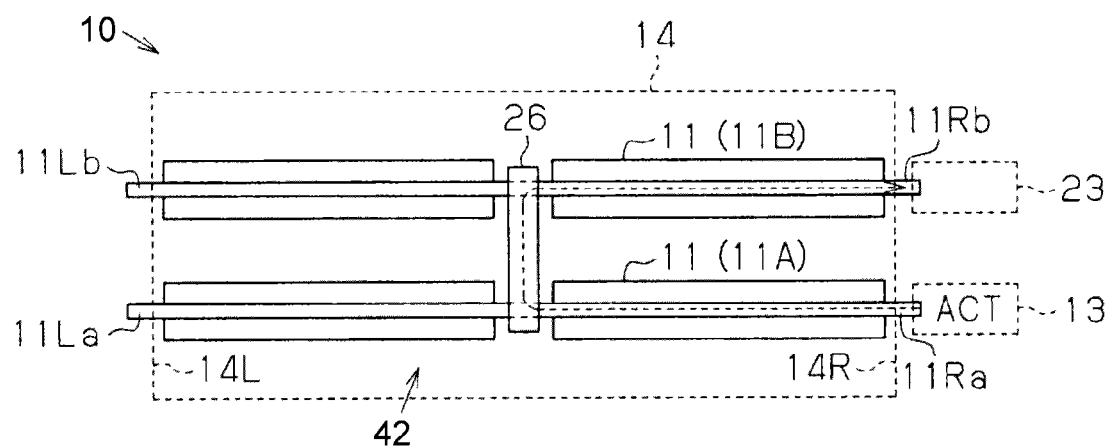
FIG. 9 is an explanatory view of a serially-arranged driving force transmission path according to still another example of the embodiment.

According to the aforementioned embodiment, the link mechanism 26 connects the shaft end portion 11La of the movable fin 11A to the shaft end portion 11Lb of the movable fin 11B at the outside of the framework of the frame 14. Alternatively, as a shutter mechanism 42 illustrated in FIG. 9, the link mechanism 26 may be arranged within the framework of the frame 14, that is, the link mechanism 26 connects middle portions of the rotary shafts 15 of the movable fins 11A, 11B.

As long as each of the movable fins 11 is configured to rotate in conjunction with one another by including a connection mechanism independently arranged to connect every two of the movable fins 11 adjacent to one another, a serially-arranged driving force transmission path is formed irrespective to the arrangement of the connection mechanism. However, in a case where such configuration is adopted, the rotary shafts 15 of the movable fins 11A, 11B are desired not to be divided into plural shaft bodies in a longitudinal direction and be rotatable relative to one another. Accordingly, similar effects as those of the aforementioned embodiment are obtained.

According to the aforementioned embodiment, the actuator 13 is fixed to the sidewall portion 14R of the frame 14 and drives the shaft end portion 11Ra of the movable fin 11A at the outside of the framework of the frame 14. Alternatively, the actuator 13 may be specifically arranged within the framework of the frame 14.

According to the aforementioned embodiment, the operation amount (the rotation amount) of the movable fin 11A arranged at the lower row of the movable fins 11 which correspond to a input portion of a driving force, is detected on the basis of the pulse signal Sp synchronizing a rotational operation of the motor 20. Further, on the basis of an output signal Ssw sent from the limit switch 23, the operational position (rotary position) of the movable fin 11B which is arranged at the upper row of the movable fins 11 and corresponds to the most downstream portion of the serially-arranged driving force transmission path, is detected to be in a position corresponding to the fully-open state of the shutter mechanism 12. In a case where the output signal Ssw sent from the limit switch 23 is not turned on (No at Step 103) even though the operation amount of the shutter mechanism 12, i.e. the rotation amount of the movable fin 11A arranged at the lower row of the movable fins 11, reaches to the regulated operation amount corresponding to the fully-open state of the shutter mechanism 12 (Yes at Step 102 in FIG. 5), abnormality is determined.

However, means to detect the operational state of the shutter mechanism 12 is not limited to the aforementioned means. For example, the grille shutter apparatus 10 may be configured such that the operational state of the shutter mechanism 12 may be detected on the basis of only a movement (rotation) of the movable fin 11B which is arranged at the upper low of the movable fins 11 and corresponds to the most downstream portion of the serially-arranged driving force transmission path, without detecting the operational state of the movable fin 11A which corresponds to the driving force input portion. That is, as described above, the movable fin 11B which is arranged at the upper row of the movable fins 11 and corresponds to the most downstream portion of the serially-arranged driving force transmission path performs normally only in a case where the link mechanism 26 which corresponds to the upper stream of the driving force transmission path and the movable fin 11A arranged at the lower row of the movable fins 11 do not generate abnormality. Accordingly, such configuration still detects precisely at least one of the status of the shutter mechanism 12, either the fully-open state or full-close state.

The operational state of the shutter mechanism 12 may be or detected on the basis of the operation of the movable fin 11A which corresponds to the driving force input portion (a first detection means). In this embodiment, the first detection means is performed at the ECU 21 (corresponding to a first detection portion). The operational state of the shutter mechanism may be detected on the basis of the operations of the movable fin 11B which is arranged at the upper row of the movable fins 11 and corresponds to the most downstream portion of the serially-arranged driving force transmission path (a second detection means). In this embodiment, the second detection means is performed at the ECU 21 (corresponding to a second detection portion). In a case where two detected operational status differ from one another, the abnormality may be determined (an abnormality determination means). In this embodiment, the abnormality determination means is performed at the ECU 21 (corresponding to an abnormality determination portion). In this case, a detection of an operational state by the first and the second detection means may be on the basis of either an operation amount or an operational position of a targeted movable fin.

According to the aforementioned embodiment, the shutter mechanism 12 opens and closes on the basis of the rotational movement of the movable fins 11. Alternatively, the shutter mechanism may include the movable fins that slide or swing other than the so-called rotational-type shutter mechanism.

According to the aforementioned embodiment, the grille shutter apparatus 10 includes the shutter mechanism 12, 32, 42 including the plural movable fins 11 and at least one of the link mechanisms 26, 26L, 26R independently arranged to connect every two of the movable fins 11 adjacent to one another. Accordingly, the shutter mechanism 12, 32, 42 makes the movable fins 11 operate in conjunction with one another. The grille shutter apparatus 10 further includes the ECU 21 for controlling the flow rate of air flowing from the grille opening portion 7 formed at the front portion of the vehicle body 2 into the vehicle body 2 on the basis of the opening and closing operations of the shutter mechanism 12, 32, 42, and the limit switch 23 for detecting the operational state of the shutter mechanism 12, 32, 42 on the basis of the operation of the movable fins 11 which correspond to the most downstream portion of the serially-arranged driving force transmission path formed at the shutter mechanism 12, 32, 42.

According to the aforementioned structure, the movable fins 11 which correspond to the most downstream portion of the serially-arranged driving force transmission path, perform normally only in a case where the link mechanism 26, 26L, 26R arranged at the upper stream of the driving force transmission path and other movable fins 11 do not generate abnormality. Thus, according to the above configuration, the operational state of the shutter mechanism 12, 32, 42 may be precisely detected in a simple configuration without increasing the number of the limit switch 23.

According to the aforementioned embodiment, the shutter mechanism 12, 32, 42 is provided with an even number of the movable fins 11 arranged parallel to one another.

According to the aforementioned structure, the input portion of the driving force and the detection portion by the limit switch 23 are integrally arranged in one side in the longitudinal direction of the movable fins 11. Because component members are assembled simply and connecting lines may be arranged in a simple manner, work efficiency is enhanced.

According to the aforementioned embodiment, the grille shutter apparatus 10 further includes the actuator 13 generating the driving force. The limit switch 23 is integrally formed with the actuator 13.

According to the aforementioned structure, the limit switch 23 and the actuator 13 may be assembled simply.

According to the aforementioned embodiment, at least one of the link mechanisms 26, 26L, 26R connects the shaft end portions 11La, 11Lb, 11Lc, 11Ra, 11Rb, 11Rc of the movable fins 11 to one another.

According to the aforementioned structure, the serially-arranged driving force transmission path is formed substantially all areas in the longitudinal direction of the movable fins 11. As a result, the operational state of the shutter mechanism 12, 32, 42 may be precisely detected. Additionally, according to the aforementioned structure, the shutter mechanism 12, 32, 42 may be precisely detected even if, for example, the rotary shaft 15 of each of the movable fins 11 may possibly be divided into the plural shafts in the longitudinal direction and the divided rotary shafts 15 may be rotatable relative to one another.

According to the aforementioned embodiment, the limit switch 23 includes the lever member 31 integrally rotating with the rotary shaft 15 of the movable fin 11 which corresponds to the most downstream portion of the serially-arranged driving force transmission path, and the switch portion 23a turned on and off in accordance with the rotary position of the lever member 31.

According to the aforementioned structure, the limit switch 23 for detecting the operational state of the shutter mechanism 12, 32, 42 may be formed in a simple configuration without interfering the opening and closing operations of the shutter mechanism 12, 32, 42.

According to the aforementioned embodiment, the limit switch 23 detects at least one of the fully-open position and the fully-closed position of the shutter mechanism 12, 32, 42.

According to the aforementioned structure, as long as the movable fins 11 which correspond to the most downstream portion of the serially-arranged driving force transmission path operate to reach the position where the shutter mechanism 12, 32, 42 is either in the fully-open state or the fully-closed state, other movable fins 11 operate to a position where the shutter mechanism 12, 32, 42 is either in the fully-open state or the fully-closed state. Thus, according to the aforementioned configuration, the operational state of the shutter mechanism 12, 32, 42 may be precisely detected in a simple configuration without increasing the number of the limit switch 23.

According to the aforementioned embodiment, the grille shutter apparatus 10 includes the shutter mechanism 12, 32, 42 including the plural movable fins 11 and at least one of the link mechanism 26, 26L, 26R independently arranged to connect every two of the movable fins 11 adjacent to one another. Accordingly, the shutter mechanism 12, 32, 42 makes the movable fins 11 operate in conjunction with one another. The shutter mechanism 12, 32, 42 further includes the ECU 21 for controlling the flow rate of air flowing from the grille opening portion 7 formed at the front portion of the vehicle body 2 into the vehicle body 2 on the basis of the opening and closing operations of the shutter mechanism 12, 32, 42. The shutter mechanism 12, 32, 42 further includes the first detection means for detecting the operational state of the shutter mechanism 12, 32, 42 on the basis of the operation of the movable fins 11 which correspond to the input portion of driving force, the second detection means for detecting the operational state of the shutter mechanism 12, 32, 42 on the basis of the operation of the movable fins 11 which correspond to the most downstream portion of the serially-arranged driving force transmission path formed at the shutter mechanism 12, 32, 42, and the abnormality determination means for determining the abnormal state of the movable fins 11 in a case where the detection results of the first and the second detection means differ from one another.

According to the aforementioned structure, the shutter mechanism 12, 32, 42 may precisely determine the abnormality of the shutter mechanism 12, 32, 42 in a simple configuration.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A grille shutter apparatus, comprising:
   a shutter mechanism including a plurality of movable fins and at least one connection mechanism independently arranged to connect every two of the movable fins adjacent to one another, the shutter mechanism making the movable fins operate in conjunction with one another;
   a control portion controlling a flow rate of air flowing from a grille opening portion, formed at a front portion of a vehicle body, into the vehicle body on a basis of opening and closing operations of the shutter mechanism; and
   a detection device detecting an operational state of the shutter mechanism on a basis of an operation of the movable fin corresponding to a most downstream portion of a serially-arranged driving force transmission path formed at the shutter mechanism,
   wherein the detection device includes a lever member integrally rotating with a rotary shaft of the movable fin corresponding to the most downstream portion of the serially-arranged driving force transmission path and a switch turned on and off in accordance with a rotary position of the lever member.

2. The grille shutter apparatus according to claim 1, wherein the shutter mechanism is provided with an even number of the movable fins arranged parallel to one another.

3. The grille shutter apparatus according to claim 1, further comprising:
   an actuator generating a driving force, wherein the detection device is integrally formed with the actuator.

4. The grille shutter apparatus according to claim 1, wherein at least one of the connection mechanisms connects shaft end portions of the movable fins to one another.

5. The grille shutter apparatus according to claim 1, wherein the detection device detects at least one of a fully-open position and a fully-closed position of the shutter mechanism.

6. A grille shutter apparatus, comprising:
   a shutter mechanism including a plurality of movable fins and at least one connection mechanism independently arranged to connect every two of the movable fins adjacent to one another, the shutter mechanism making the movable fins operate in conjunction with one another;
   a control portion controlling a flow rate of air flowing from a grille opening portion, formed at a front portion of a vehicle body, into the vehicle body on a basis of opening and closing operations of the shutter mechanism;
   a first detection portion detecting an operational state of the shutter mechanism on a basis of an operation of the movable fin corresponding to the input portion of driving force;

a second detection portion detecting the operational state of the shutter mechanism on a basis of the operation of the movable fin corresponding to the most downstream portion of the serially-arranged driving force transmission path formed at the shutter mechanism; and an abnormality determination portion determining an abnormal state of the movable fins in a case where detection results at the first and the second detection portions differ from one another.

\* \* \* \* \*